United States Patent [19]

Engle

[11] 3,955,370
[45] May 11, 1976

[54] HYDRAULIC SLACK ADJUSTER AND BRAKE CIRCUITS THEREFOR

[75] Inventor: Thomas H. Engle, Cape Vincent, N.Y.

[73] Assignee: General Signal Corporation, Rochester, N.Y.

[22] Filed: June 21, 1974

[21] Appl. No.: 483,843

Related U.S. Application Data

[63] Continuation of Ser. No. 302,415, Oct. 31, 1972, abandoned.

[52] U.S. Cl. .............................. 60/590; 188/196 A
[51] Int. Cl.² ............................................ F16D 65/74
[58] Field of Search ............ 60/590, 580; 188/351, 188/196 A; 60/579, 592

[56] References Cited
UNITED STATES PATENTS

| | | | |
|---|---|---|---|
| 2,345,811 | 4/1944 | Hays | 188/351 |
| 2,523,172 | 9/1950 | Wilson | 60/590 |
| 2,544,849 | 3/1951 | Martin | 60/590 |
| 2,593,192 | 4/1952 | Rockwell | 188/351 |
| 2,688,335 | 9/1954 | Gunderson | 188/196 A UX |
| 2,924,945 | 2/1960 | Oswalt | 188/351 |
| 2,928,508 | 3/1960 | Rockwell | 188/351 |
| 3,161,024 | 12/1964 | Ryskamp | 60/580 |
| 3,208,224 | 9/1965 | Hoekstra | 60/590 X |

Primary Examiner—Martin P. Schwadron
Assistant Examiner—H Burks, Sr.
Attorney, Agent, or Firm—Harold S. Wynn

[57] ABSTRACT

The disclosure concerns a hydraulic slack adjuster useful in the brake circuits of railway as well as road vehicles, and improved brake circuits and apparatus particularly suited to the needs of railway rapid transit service. One type of circuit incorporates the slack adjuster in combination with a simple air-to-hydraulic booster and defines a portion of a service brake, and another type utilizes this apparatus in combination with a hand brake control unit and a double check valve and enables the brake cylinders to perform both service braking and hand braking functions.

4 Claims, 7 Drawing Figures

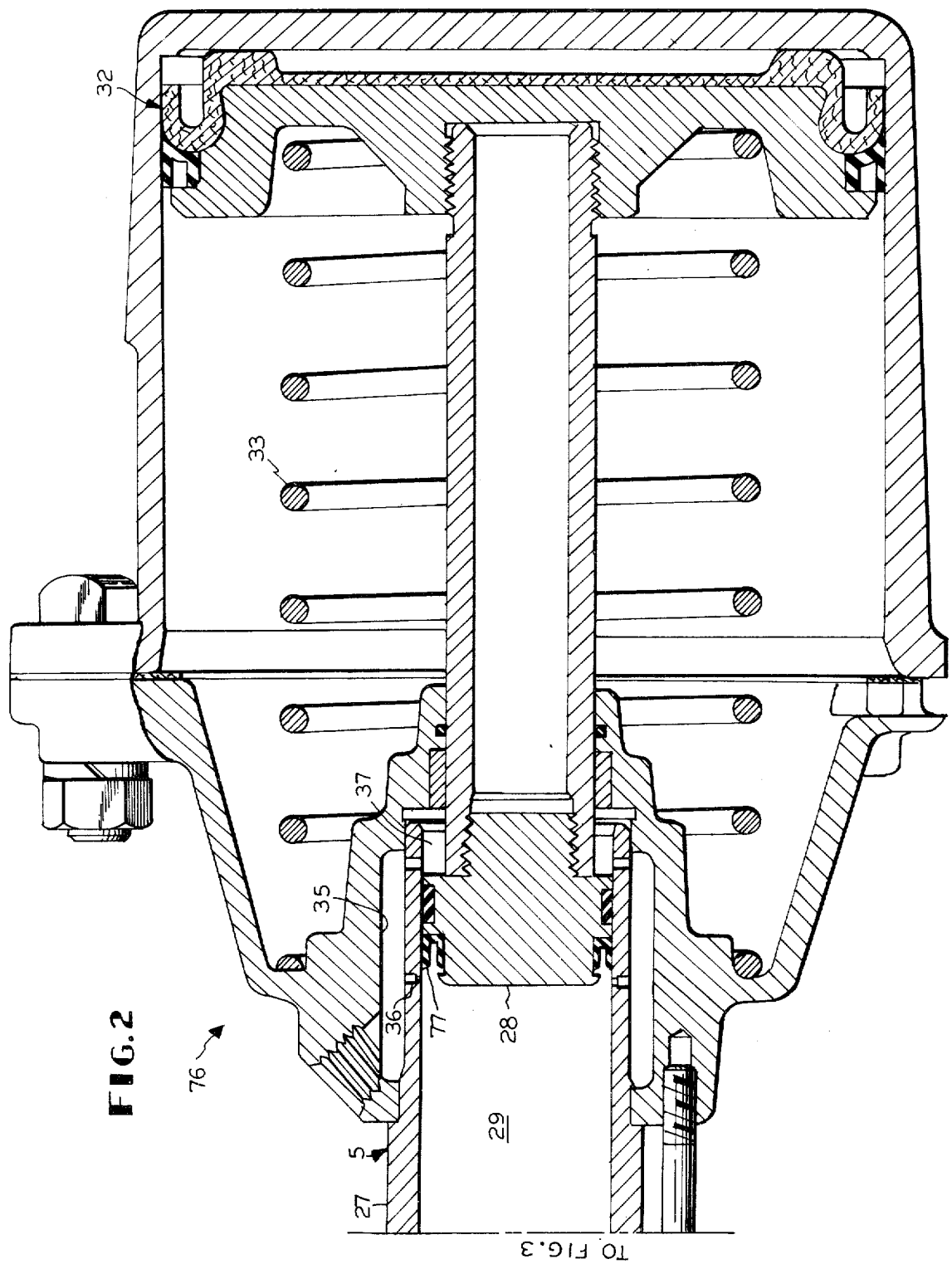

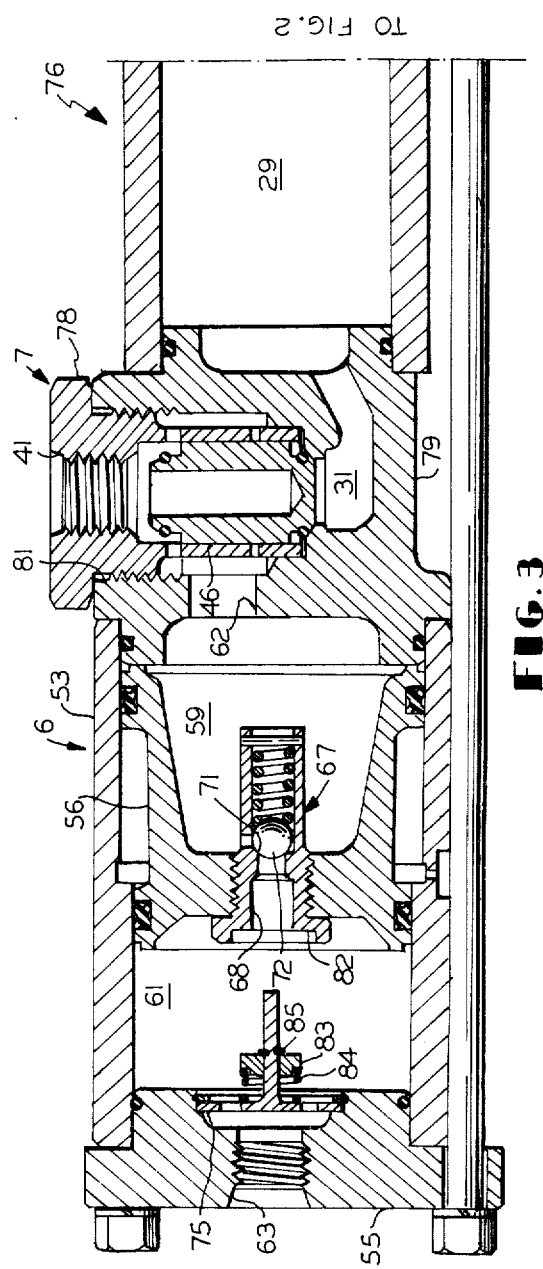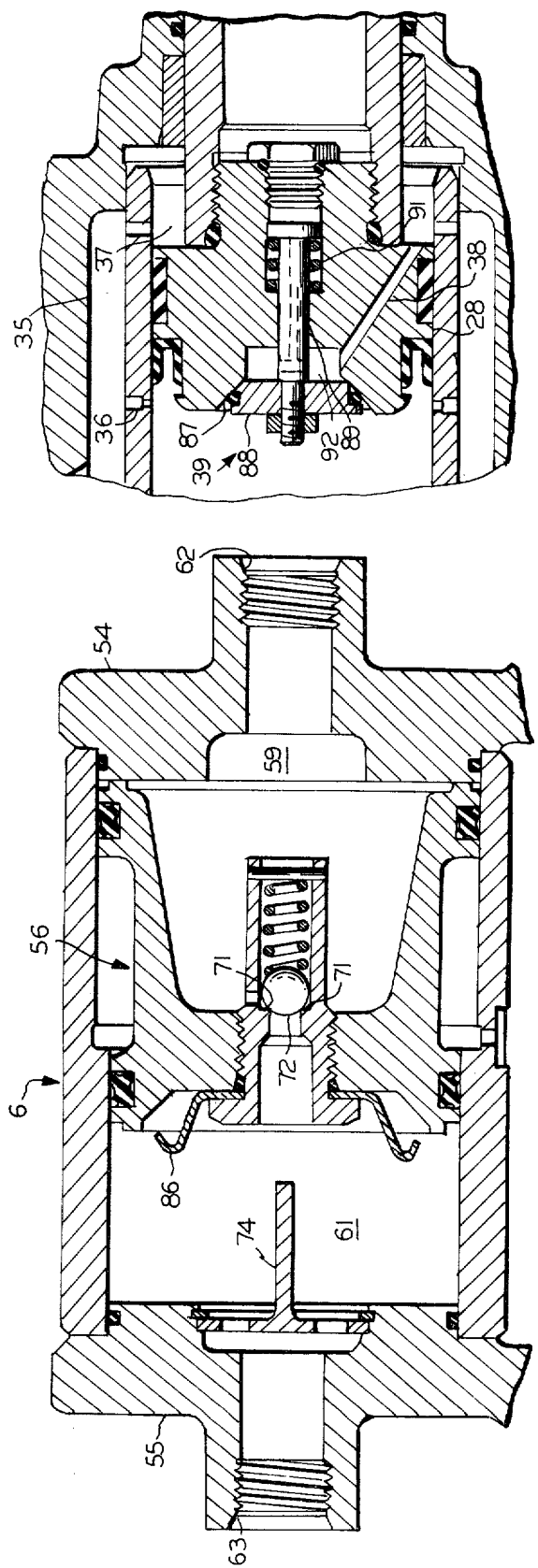

HYDRAULIC SLACK ADJUSTER AND BRAKE CIRCUITS THEREFOR

This is a continuation of application Ser. No. 302,415, filed Oct. 31, 1972, now abandoned.

BACKGROUND AND SUMMARY OF THE INVENTION

Application Ser. No. 150,054, filed June 4, 1971 now U.S. Pat. No. 3,707,309, discloses a hydraulic brake system for railway rapid transit service which is known commercially as the PS-68 Brake Equipment marketed by the New York Air Brake Company, a Unit of General Signal Corporation. In this system, the brake cylinders on each truck are provided with a translating and valving unit of the type described in U.S. Pat. No. 3,622,207, granted Nov. 23, 1971, which joins the cylinders to a hand brake control unit and to an air-to-hydraulic booster constructed in accordance with the preferred teachings of U.S. Pat. No. 3,513,656, granted May 26, 1970. Although this system is practical and affords many advantages, it does have the following undesirable characteristics:

1. The booster has a two-stage discharge stroke which enables it to effect take-up of shoe clearance with minimum consumption of air. This feature is desirable, particularly in the case of brakes used on freight cars and locomotives where conservation of compressed air can be a necessity. However, since the time required for the booster to shift from the low pressure to the high pressure discharge stage does delay somewhat applications of the brakes, the desirable feature is accompanied by an adverse side effect. In the case of rapid transit service, this side effect can be intolerable, and, in any event, probably outweighs reduction in air consumption.

2. The booster affords double-acting slack compensation to the service brake, whereas the translating and valving unit affords only slack take-up compensation to the hand brake. Therefore, the increased shoe clearance needed for brake shoe or wheel replacment is created by cycling of the service brake. This procedure, of course, requires the availability on the car of compressed air. Since the reservoirs on the car are not always charged during this type of maintenance, the procedure sometimes can be burdensome.

3. If shoe replacement is not followed immediately by cycling of the service brake, shoe clearance can be reduced to the point where thermal expansion of the hydraulic fluid will develop substantial pressures in the brake cylinders. The system includes no provision for relieving such pressures, and therefore the car may be reintroduced into service with the shoes in tight contact with the wheels. This stuck brake condition obviously is undesirable.

4. The system employs relatively complex components which are heavy and require many parts.

One object of the present invention is to provide an improved hand brake-service brake system which eliminates the undesirable characteristics mentioned above. According to the invention, the new system includes a simple single stage booster, and a separate hydraulic slack-adjusting unit which is selectively connected with the booster or the hand brake control unit by a double check valve and which, therefore, serves both the service brake and the hand brake. This arrangement eliminates the time delay inherent in the two-stage booster and effects a substantial reduction in the number of parts and in the weight of the equipment. It also permits a significant reduction in the size of the reservoir connection of the booster. The slack adjuster unit allows take-up of excess shoe clearance during cycling of either brake, and, under release conditions, it permits transfer of fluid from the brake cylinders to the system reservoir whenever cylinder pressure exceeds a predetermined, relatively low level. This relief feature not only precludes the stuck brake condition mentioned above, but also permits creation of the increased shoe clearance needed for shoe or wheel replacement by the simple expedient of manually retracting the brake cylinder with a pry bar. In its preferred form, the slack adjuster affords true double-acting slack compensation, so it corrects for insufficient as well as excess shoe clearance during cycling of either brake. This feature enables the system to maintain a predetermined shoe clearance throughout the service life of the shoes. Moreover, it permits shoe clearance to be increased intentionally during maintenance operations by cycling of either of the brakes.

The booster-slack adjuster combination is useful by itself to control the brake cylinders on trucks which do not require hand braking. Preferably, these two components are packaged in a unit which is adapted to accept, as alternative constituents, a cartridge version of the double check valve or a sealed plug. In this way, the same basic unit can be adapted for use in either a combined service brake-hand brake system or an exclusive service brake system by simply substituting the plug or the cartridge for the other alternative.

The slack adjuster unit provided by the invention can be used with any source of hydraulic pressure, and thus has utility outside the field of railway brakes. For example, the unit can be built in small sizes and used between the master cylinder and the wheel cylinders of an automobile to maintain brake adjustment. This application is attractive because it eliminates the need for the complex mechanical devices now employed for this purpose. The unit can also be used to maintain very close clearances in either railway or automotive brakes of the disc type. The last mentioned application has special appeal because, with clearances on the order of a few thousandths of an inch, the energy requirements of the brake can be satisfied by a master cylinder small enough to obviate the vacuum booster now being used in automotive disc brake systems.

BRIEF DESCRIPTION OF THE DRAWINGS

Several embodiments of the invention are described herein with reference to the accompanying drawings in which:

FIG. 2 is a sectional view of the booster portion of the preferred booster, slack adjuster, and double check valve assembly.

FIG. 3 is a sectional view showing the remaining portion of the assembly partially illustrated in FIG. 2.

FIG. 4 is a sectional view of a modified form of slack adjuster.

FIG. 5 is a sectional view of a portion of the booster showing an alternative construction.

DESCRIPTION OF THE EMBODIMENT OF FIG. 1

Figure 1:
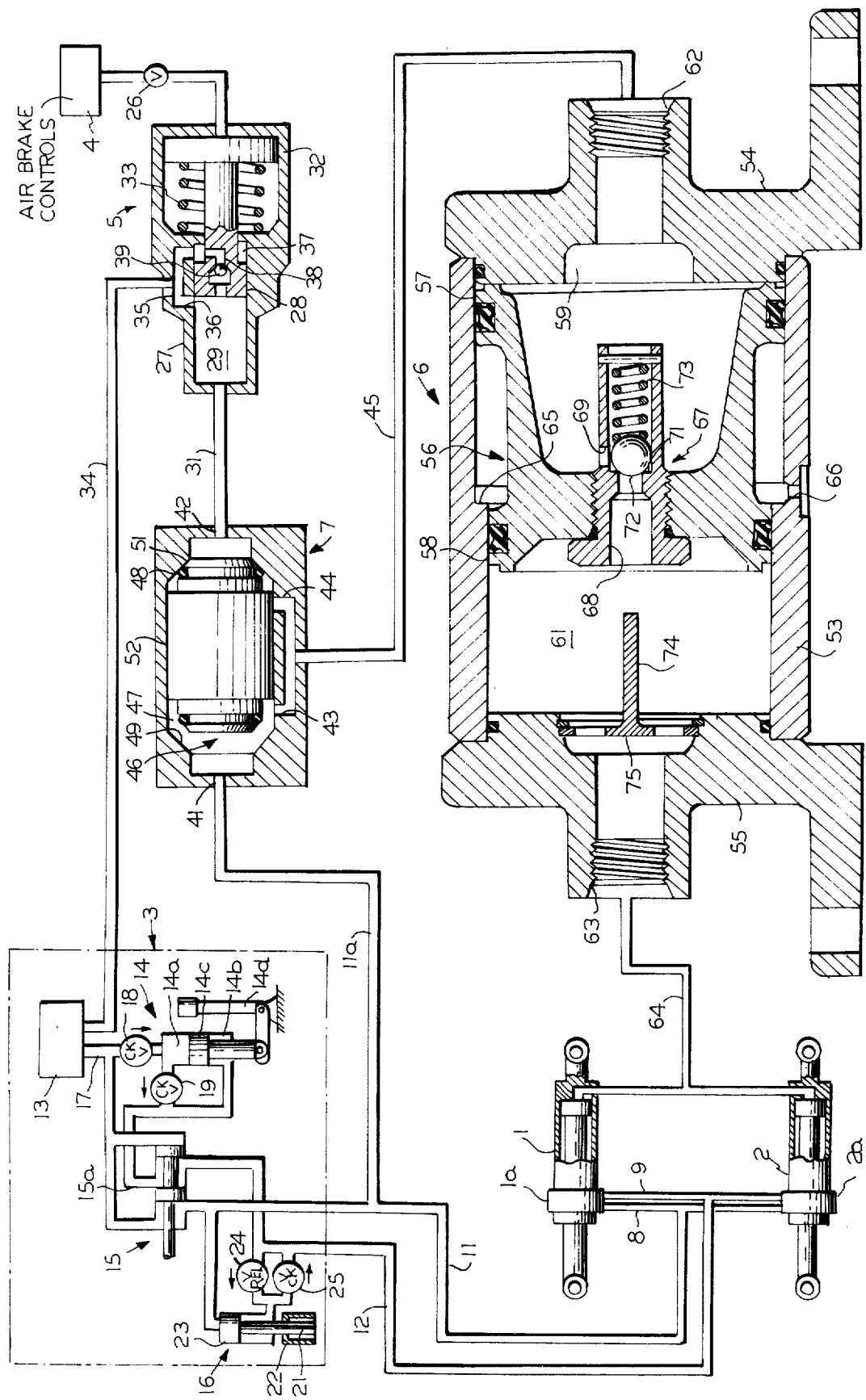
FIG. 1 is a schematic diagram of a combined hand brake-service brake system for one truck of a rapid transit car.

Referring to FIG. 1, the braking system comprises a pair of identical brake cylinders 1 and 2, a hydraulic hand brake control unit 3, a service brake including air brake control apparatus 4 and air-to-hydraulic booster 5, a double-acting hydraulic slack adjuster unit 6, and a double check valve unit 7 which selectively connects unit 6 with hand brake control 3 or booster 5. Each of the brake cylinders includes a lock 1a or 2a constructed in accordance with the teachings in U.S. Pat. No. 3,586,138, granted June 22, 1971, and which is actuated by hydraulic lock and unlock motors. The lock and unlock motors of the two cylinders are interconnected by conduits 8 and 9, respectively.

The lock and unlock circuits 8 and 9 of the brake cylinders are connected, respectively, with control lines 11 and 12 which are selectively pressurized and vented by hand brake control unit 3. This unit includes a reservoir 13, a manually operated, differential area piston pump 14, a manually operated reversing valve 15, and a lock indicator 16. The head end working space 14a of pump 14 is connected with reservoir 13 through conduit 17 and inlet check valve 18, and with the rod end working space 14b through discharge check valve 19. Space 14b, on the other hand, is joined directly to the inlet passage 15a of reversing valve 15. The effective area of the head end of pump piston 14c is twice the effective area of the rod end; therefore, on each upward stroke of the piston, one-half of the oil displaced from space 14a is delivered to valve 15, and the balance is transferred to space 14b. On the following downward stroke of piston 14c, the oil in space 14b is discharged to valve 15, and space 14a is again filled with oil through inlet check valve 18. Reversing valve 15 is a two-position valve and serves to direct the output of pump 14 to a selected one of the conduits 11 and 12 while connecting the remaining conduit with reservoir 13 through conduit 17.

The indicator 16 of unit 3 includes a visual signal member in the form of a rod 21 which is retracted into or moved out of a housing 22 depending upon whether the cylinder locks are released or applied. Member 21 is actuated automatically by a double-acting motor 23 whose opposed working spaces are connected with control lines 11 and 12, respectively. One of these connections contains a relief and by-pass check valve combination which insures that motor 23 will not retract member 21 until the pressure in line 12 reaches a level safely above (e.g. two times) that required to effect release of the locks, but which does not impede extension movement of that member. In the illustrated embodiment, the valve combination 24, 25 is located in the connection between line 12 and the rod end space of motor 23 and controls the admission of pressure fluid to the motor.

The air brake control apparatus 4, which preferably incorporates the teachings of U.S. Pat. No. 3,536,360, granted Oct. 27, 1970, is connected with booster 5 through a shut-off valve 26 and supplies it with a pneumatic command pressure which is to be transduced into the proportional hydraulic pressure which actuates brake cylinders 1 and 2 during service braking applications. Booster 5 comprises a hydraulic pump including a cylinder 27 and a reciprocable piston 28 which cooperates to define a working space 29 provided with a passage 31 through which fluid is transferred to and from the brake cylinders. Piston 28 is moved on its discharge stroke to displace oil from space 29 by an air motor 32 which responds to the output pressure of apparatus 4, and is moved on its return stroke to the illustrated retracted position by a return spring 33. The maximum output pressure of the pump equals the product of the pneumatic pressure supplied to motor 32 and the ratio of the effective area of the motor piston to the effective area of pump piston 28. Booster 5 is connected with the reservoir 13 of hand brake control unit 3 via conduit 34 and is provided with two parallel paths through which this conduit communicates with working space 29. The first path comprises passage 35, and a valve which is defined by pump piston 28 and by a port 36 formed in the wall of cylinder 27 and which is open only when the piston is in, or very near, its retracted position. This path serves to maintain space 29, and the volumes connected with it, liquid-filled when the service brake is released, and also to allow escape of oil from the brake cylinders during shoe clearance-increasing operations. The second flow path comprises passage 35, the rod end space 37 of cylinder 27, and a passage 38 extending through piston 28 and containing a check valve 39 oriented to block flow from the working space. As explained later, this path is effective to control the suction which booster 5 imposes on slack adjuster 6 and to insure return of piston 28 to its retracted position.

Double check valve unit 7 serves selectively to connect slack adjuster 6 with hand brake control line 11 or booster transfer passage 31 depending which of the last mentioned conduits is at the higher pressure. The valve unit comprises a body formed with a pair of control ports 41 and 42 which are connected, respectively, with control line branch 11a and passage 31, and a pair of system ports 43 and 44 which communicate with slack adjuster 6 via conduit 45, and in which is mounted a reciprocable switching spool 46. The opposite ends of spool 46 are exposed to the pressures at the control ports 41 and 42, and each is provided with a valve head 47 or 48 which coacts with one or the other of a pair of body seats 49 and 51 to control flow between the associated control port and the adjacent system port 43 or 44. The valving surface of each head includes a metal portion and an elastic O-ring which cooperates with the seat to prevent high and low pressure leakage, respectively. Spool 46 is formed with a central land 52 whose axial dimension is such that the land partially obstructs, and thus restricts, both of the system ports 43 and 44 when the spool is in the midposition. The fact that both of the ports 43 and 44 are never closed completely insures that spool 46 will not stick in the midposition, and the restrictions just noted prevent cross flow between the control ports 41 and 42 of a magnitude sufficient to impair the operation of one or the other of the brakes.

Slack adjuster unit 6 comprises a stepped cylinder 53 whose opposite ends are closed by cover plates 54 and 55 and which contains a differential area reciprocable piston 56 formed with large and small diameter portions 57 and 58 which fit the corresponding portions of the cylinder. Piston 56 divides cylinder 53 into a pair of working spaces 59 and 61; the space 59 at the larger diameter end of the cylinder being in continuous communication with conduit 45 through a port 62, and the other space 61 being in continuous communication with the brake cylinders 1 and 2 via port 63 and branched conduit 64. The intermediate portion of the cylinder, which includes the region around step 65, is vented to atmosphere through a port 66. The two working spaces 59 and 61 normally are isolated from each other, but, under certain conditions, fluid can be transferred between the spaces through a cartridge type valve unit 67 which is threaded into an axial bore extending through piston 56. This valve unit comprises a transfer passage including axial and radial portions 68 and 69, respectively, which are separated by a seat 71 arranged to coact with a spherical valve head 72. The valve head is urged toward seat 71 by the pressure in space 59 and by a coil compression spring 73, and is shifted in the opening direction by the pressure in space 61. Thus, the valve performs a relief function and allows flow from space 61 to space 59 when the pressure in the former exceeds the pressure in the latter by a predetermined amount. In a typical case, spring 73 is selected to permit opening of the valve upon development of a differential pressure on the order of 12 p.s.i. Valve head 72 also can be unseated mechanically by a push rod 74 carried by a spider 75 fixed to cover 55. This actuation scheme is effective to open the valve just before piston 56 reaches the limit of its leftward travel (e.g. 1/16 inch before the piston abuts cover 55), and thereby permit flow from space 59 to space 61. The importance of these fluid transfer functions of valve unit 67 will be evident from the description of operation presented below. The stroke of piston 56, i.e., the axial distance between the limiting positions in which the piston abuts covers 54 and 55, respectively, determines the clearance between the brake shoes and the wheels.

When the FIG. 1 system is in service and both brakes are released, the components in units 3, 5, and 6 assume their illustrated positions, and the spool 46 of valve unit 7 remains in the position which it assumed during the immediately preceding brake application. When a service brake application is initiated, air brake controls 4 will deliver compressed air to booster 5 at a pressure indicative of the desired braking effort, and air motor 32 will move pump piston 28 to the left on its discharge stroke. Initial movement of the piston isolates port 36 from working space 29, so for all practical purposes the oil displaced from the working space exits through passage 31. Since branch line 11a is vented to reservoir 13 while the hand brake is released, the oil delivered to passage 31 by the booster will shift spool 46 of double check valve 7 to the left, thereby causing head 47 to engage seat 49 and isolate port 43 from port 41, and also causing head 48 to move away from seat 51 and open a flow path from port 42 and port 44. As a result, the oil displaced from booster 5 will pass through valve unit 7 and conduit 45 to the working space 59 of slack adjuster unit 6. As pressure develops in this space, piston 56 shifts to the left and displaces oil from working space 61 to the brake cylinders 1 and 2. Therefore, the cylinders will extend and move the shoes into contact with the wheels. If shoe clearance is less than that which unit 6 is designed to maintain, the shoes will be moved into contact with the wheels before piston 56 reaches the limit of its leftward movement, and possibly after the piston has moved only a slight distance from its initial position. Consequently, at this point, the pressure in working space 61 will rise above the pressure in space 59 as a result of the difference between the cross sectional areas of the piston portions 57 and 58. When the pressure differential reaches the setting of valve unit 67, spherical head 72 will unseat and permit flow from space 61 to space 59 through transfer passage 68, 69. As a result, piston 56 will be able to shift all the way to its limiting left hand position.

Just before piston 56 abuts cover 55, push rod 74 will engage valve head 72. Therefore, when the piston comes to rest, the valve head will be held open, and brake cylinders 1 and 2 will be in direct communication with the working space 29 of booster 5. Because of this, oil can pass to the cylinders as may be necessary during the brake application, and the pressures therein will be maintained proportional to the pneumatic command pressure developed by air brake controls 4.

When the service brake is released, the output pressure of the controls 4 is dissipated, so booster return spring 33 retracts piston 28 and thereby reduces the pressure in the working spaces 29 and 59 of booster 5 and slack adjuster 6, respectively. Accordingly, brake cylinder pressure, which prevails in space 61, is effective to shift piston 56 to the right to effect closure of valve 71, 72. Therefore, as booster piston 28 retracts and withdraws oil from working space 59, slack adjuster piston 56 shifts back toward its initial position and effects transfer of oil from the brake cylinders to working space 61. These fluid transfers are effected by the combined actions of the suction created by the booster and the retraction forces exerted on the cylinders either by return springs, or, in the more usual case, by gravity forces acting on the shoes and their hangers. Assuming that shoe clearance at the commencement of the application was too small, the amount of oil expelled from working space 59 during rightward movement of piston 56 necessarily will be greater than the quantity of oil displaced from booster working space 29 during the brake application; therefore, booster piston 28 will return to its retracted position before slack adjuster piston 56 reaches its limiting right hand position. This, however, does not prevent piston 56 from moving to that limiting position because full retraction of booster piston 28 effects reopening of port 36 and thereby allows the remaining oil to be displaced from working space 59 to escape to reservoir 13. As a result, the shoe clearance prevailing at the end of the brake release will be determined by the volumetric displacement of slack adjuster piston portion 58. Thus, cycling of the service brake under the assumed condtion of too little shoe clearance causes unit 6 to increase clearance to the desired value.

In cases where the service brake is applied when shoe clearance initially is greater than desired, slack adjuster piston 56 will reach its left hand limit of motion before brake cylinders 1 and 2 have brought the shoe into contact with the wheels. Therefore, in this case, there is no increase in the pressure in working space 61 during leftward movement of piston 56, and valve 71, 72 remains closed until just before the piston contacts cover 55. At that point, push rod 74 unseats valve head 72 so that the additional oil required to take up the remaining shoe clearance, and to develop the desired level of braking force, can be transferred to the brake cylinder circuit through passages 68 and 69. Since the brake application causes piston 56 to move full stroke into engagement with cover 55, it follows that subsequent release of the service brake will cause unit 6 to withdraw from cylinders 1 and 2 exactly the same quantity of oil as in the case described earlier. Thus it follows that in situations where shoe clearance initially is too great, unit 6 reduces it to the desired value.

It should be observed that, when shoe clearance initially is too great the quantity of oil discharged from booster 5 during the application will necessarily be greater than the quantity returned to the booster when the brakes are subsequently released. Therefore, during the release, slack adjuster piston 56 will return to its initial position in contact with cover 54 before booster piston 28 reaches its retracted position. Under this condition, oil will be transferred from reservoir 13 to working space 29 through passage 38 and check valve 39, thereby insuring that piston 28 will return to its retracted position.

If a hand brake application is required, the crewman will shift valve 15 to the left to the position in which control lines 11 and 12 are connected, respectively, with supply passage 15a and reservoir 13, and then manipulate handle 14d to cause pump 14 to discharge oil under pressure to line 11. As pressure develops in this line, spool 46 of double check valve unit 7 will shift to the illustrated position and isolate port 44 from port 42 and interconnect ports 41 and 43. Therefore, oil discharged by pump 14 may now pass through conduit 45 to unit 6, and cause the latter to deliver fluid to the brake cylinders exactly as in the case of a service brake application. Simultaneously, a portion of the output of pump 14 is delivered to the lock motors of the cylinder locking devices 1a and 2a, and to the indicator actuating motor 23. Consequently, after the cylinders 1 and 2 have set the brakes, the locks will be effective to hold them in that condition, and indicator 21 will have been projected from housing 22 to thereby provide a visual indication of this condition.

In order to release the hand brake application, the crewman will shift reversing valve 15 back to the illustrated position, and again actuate pump 14. Under this condition, the output of pump 14 is delivered through control line 12 to the unlock motors of mechanisms 1a and 2a, and control line 11 is vented to reservoir 13. When the pressure in line 12 reaches the required level, the unlock motors will release the cylinder locks and allow the cylinders to retract under the action of the external forces acting on them. After the unlock motors have shifted, further stroking of hand brake pump 14 will raise the pressure in line 12 to the setting of relief valve 24. At that time, motor 23 will be pressurized and will retract indicator 21. As the cylinders 1 and 2 retract, they displace oil to working space 61, and piston 56 shifts back to its initial position and displaces oil from working space 59 to reservoir 13 via conduit 45, double check valve unit 7, branch line 11a, control line 11, and reversing valve 15. The shoe clearance prevailing at the end of the release is determined by the displacement of piston portion 58, and thus will be exactly the same as after cycling of the service brake. Therefore, regardless of whether initial clearance is too small or too great, the final clearance will be the desired amount.

If the hand brake is applied while a service brake application is in effect, spool 46 of unit 7 will shift to the illustrated position and thereby connect line 11 with the brake cylinders, but little if any oil will be delivered to the cylinders because the brakes are already applied. However, the pressure developed in control line 11 will cause the lock motors to activate the cylinder locks. In the event the hand brake application is then released, the unlock motors of mechanisms 1a and 2a will release the cylinder locks, but brake cylinder pressure will not be released because spool 46 will shift to its left hand position and reconnect booster 5 with slack adjuster 6 as soon as control line 11 is vented.

In a similar manner, if the service brake is applied while a hand brake application is in effect, spool 46 will shift to the left hand limiting position and connect booster working space 29 with the brake cylinders 1 and 2, but little if any oil will actually be delivered to the cylinders. When the service brake application is released, spool 46 may or may not shift back to its illustrated position, depending upon whether control line 11 is still pressurized, but in no event will the release affect the condition of the cylinder locks. Moreover, since the booster in this case supplies only very little oil to unit 6 during the service brake application, it follows that the release will effect transfer of little oil from unit 6 back to the booster regardless of whether or not spool 46 shifts.

In the event a worn shoe requires replacement, either of two relatively simple procedures may be followed. In the first, the cylinder carrying the worn shoe is retracted manually the amount permitted by the clearance at the other shoe, a spacer is inserted between the worn shoe and its wheel, and then either the hand brake or the service brake is cycled to establish the controlled clearance for which unit 6 is designed with the spacer in place. These operations are then repeated using progressively wider spacers until clearance sufficient to accomodate the new shoe is created. The second replacement procedure involves use of a lever to pry back the worn shoe and cause the associated cylinder 1 or 2 to displace oil to the reservoir through working space 61, valve 71, 72, working space 59, conduit 45, double check valve unit 7, and either passage 31, working space 29, port 36, passage 35 and conduit 34, or branch line 11a, line 11, and reversing valve 15. This operation is practical because the low setting of valve 71, 72 normally requires exertion of a retraction force on the order of only about 100 pounds.

In the event shoe replacement is not followed immediately by cycling of one of the brakes, the resulting shoe clearance can be so small that fluid expansion resulting from an increase in temperature can cause the cylinders to press the brake shoes against the wheels. However, since valve 71 72 will open and allow oil to escape from cylinders 1 and 2 to reservoir 13 through conduit 45, valve unit 7, and either hand brake control unit 3 or booster 5 at a relatively low pressure level, the shoe-wheel contact force will not be high enough to cause overheating of the wheels or excessive wear of the shoes. In fact, in the illustrated embodiment wherein valve 71, 72 opens under a pressure differential of 12 p.s.i., that contact force is limited to about 100 pounds.

DESCRIPTION OF THE EMBODIMENT OF FIGS. 2 AND 3

In the preferred version of the hand brake-service brake system, booster 5, slack adjuster 6 and double check valve 7 are combined in the assembly 76 shown in FIGS. 2 and 3. The parts of this assembly are labeled with the same numerals as their counterparts in FIG. 1, and the construction of the composite will be evident from the drawing. However, it should be noted that, in assembly 76, booster passage 38 is defined by the radial clearance between pump piston 28 and cylinder 27, and that the piston packing 77 serves as the check valve 39 shown in FIG. 1. It also is appropriate to remark that the double check valve unit 7 used in assembly 76 is constructed as a cartridge unit 78 which is threaded into a block 79 clamped between the cylinders 27 and 53 of booster 5 and slack adjuster 6. This design minimizes the number of parts, and permits the same package to be used in a purely service brake system by merely withdrawing cartridge 78 and plugging the threaded opening 81 in block 79.

The slack adjuster unit 6 in assembly 76 differs from its FIG. 1 counterpart in one important respect which deserves special attention. It will be recalled from the description of operation of the FIG. 1 embodiment that, when the brakes are applied, push rod 74 holds spherical valve head 72 off seat 71 and effects equalization of the pressures in working spaces 59 and 61. Because of the difference between the areas of piston portions 57 and 58, the balanced pressure condition will maintain piston 56 in its limiting left hand position. When the brakes are subsequently released, the pressure in space 59 must be reduced below the pressure in space 61 an amount sufficient to offset the differential between the areas of piston portions 57 and 58 and overcome piston friction in order for the piston to begin to move back to its initial position. Since valve 71, 72 is open at the instant release is initiated, it follows that the required pressure differential is developed initially solely as a result of the flow of oil from space 61 to space 59 through the valve. Normally, brake release is effected quickly enough that the rate of flow through valve 71, 72 is sufficient to develop the pressure differential needed to shift piston 56 and allow the valve to close. However, if the pressure in working space 59 is dissipated very slowly, the required pressure differential may not be developed, and consequently piston 56 can remain in the limiting left hand position. If this happens, all of the oil in the brake cylinders can escape to reservoir 13, and the cylinders 1 and 2 will fully retract and destroy the slack compensation which unit 6 had previously effected. The stroke of booster piston 28 is sized on the assumption that slack compensation is afforded; therefore, during the next service brake application, the booster piston will bottom out (i.e., reach the end of its discharge stroke) before the existing shoe clearance has been taken up. As a result, the service brake will be ineffective for that application.

In order to eliminate loss of the service brake in the manner just described the slack adjuster unit 6 of assembly 76 incorporates means for impeding the flow of oil through valve 71, 72 when the latter is being held open by push rod 74. This means takes the form of a check valve comprising a seat 82 which is carried by cartridge unit 67 and surrounds passage 68, and a cooperating head 83 which is mounted to slide along push rod 74. Head 83 is biased outward along the push rod by a coil compression spring 84 seated on spider 75, and its motion in that direction is limited by a snap ring 85 carried by the push rod. This ring is so located that, during leftward movement of piston 56, check valve seat 82 will engage head 83 just before spherical head 72 engages the push rod. With this arangement, check valve 82, 83 always will prevent flow from space 61 to space 59 whenever valve head 72 is held open by the push rod. As a result, the pressure differential required to shift piston 56 back to the limiting right hand position always will be developed at the beginning of a brake release regardless of the rate at which the pressure in working space 59 is dissipated. The check valve 82, 83, of course, has no effect after piston 56 has moved far enough for snap ring 85 to separate head 83 from its seat, and therefore valve 71, 72 will be able to prevent stuck brakes and to permit increases in clearance during brake shoe replacements in the manner described earlier.

It should be observed that check valve 82, 83 does alter slightly the operation of unit 6 in situations where the unit must increase shoe clearance during a brake application. In these cases, valve 71, 72 will open and permit flow from space 61 to space 59 until leftward movement of piston 56 brings seat 82 into contact with head 83, but, at that point valve 82, 82 will interrupt such flow. Thus, the piston 56 will not move all the way to its limiting left hand position. This difference, however, is of no practical significance since it involves only about 1/16 inch difference in the stroke of piston 56, and results in only a slight increase in brake cylinder pressure.

In cases where unit 6 decreases clearance, piston 56 will move to the limit of its leftward travel before the cylinders 1 and 2 bring the shoes into contact with the wheels. Therefore, in this situation the additional demand of the cyinders is satisfied as in FIG. 1, except that the oil transferred to space 61 must unseat and flow past check valve 82, 82.

DESCRIPTION OF THE EMBODIMENT OF FIG. 4

FIG. 4 illustrates an alternative means for impeding reverse flow through valve 71, 72, at the commencement of a brake release. In this version of slack adjuster unit 6, piston 56 is equipped with a leaf spring 86 which is clamped in place by cartridge unit 67 and is so formed that it seats against cover 55 just before the leftward motion of the piston brings valve head 72 into contact with push rod 74. Spring 86 is designed to exert a force which will move piston 56 to the right and separate head 72 from rod 74 whenever the force holding the piston against cover 55, and consequently the pressures in working spaces 59 and 61, decreases to a predetermined low level. Thus, when a brake release is initiated, and the pressure in working space 59 begins to decrease, spring 86 will effect closure of valve 71, 72, and thereby cause the valve to impede flow from working space 61 and guarantee development of the pressure differential needed to return piston 56 to its limiting right hand position. As a result, the clearance controlling function of unit 6 will be preserved even during a very slow release of the brakes. In all other respects, the FIG. 4 slack adjuster operates in the same way as its FIG. 1 counterpart.

DESCRIPTION OF THE EMBODIMENT OF FIG. 5

As pointed out above, the booster 5 of assembly 76 uses piston packing 77 as the check valve in the vacuum-breaking supply path connecting reservoir 13 with pump working space 29. This arrangement is appealing because of its simplicity, but proper design of the packing is difficult and time-consuming. Therefore, from the designer's standpoint, the alternative arrangement shown in FIG. 5 may be preferred.

The FIG. 5 embodiment utilizes a conventional mechanical type check valve 39 including seat 87 formed on piston 28, and a cooperating poppet head 88 which is fixed to a reciprocable stem 89 and is biased against the seat by a light coil compression spring 91. Oil is delivered to the check valve through the inclined passage 38 which interconnects the rod end cylinder space 37 with a chamber 92 formed in piston 28 adjacent the upstream end of seat 87. As in the case of double check valve unit 7, the head 88 has a valving surface comprising both a metal portion and a portion defined by an elastic o-ring. With this type of design, the pressure drop across the valve head must be kept relatively low in order to prevent lifting of the o-ring from its groove in the head; therefore, the angled passage 38 is so sized that it develops the major portion of the pressure differential required to open valve 39. This aspect of the design has a desirable side effect in that it affords to the designer a convenient way to control the degree of suction which the booster 5 applies to slack adjuster 6. Thus, in situations where it is desirable to use booster suction to augment the retraction forces acting on cylinders 1 and 2, the degree of such assistance can be increased or decreased easily by merely reducing or increasing the diameter of passage 38.

DESCRIPTION OF THE EMBODIMENT OF FIG. 6

At the present time, it is preferred that the slack adjuster unit be capable of increasing as well as decreasing shoe clearance during a brake cycle because this minimizes dragging of the shoes and is accomplished in a relatively simple manner. Moreover, in railway applications, particularly those which employ tread brakes, the ability of the double-acting slack adjuster to maintain a definite, finite clearance is considered desirable because crewmen commonly determine whether the brakes are applied or released from visual inspection of the shoes. However, since slack take-up and relief are the essential functions of the slack adjuster unit, it must be understood that the invention encompasses embodiments of that unit which do not afford clearance-increasing compensation during a brake cycle. One such embodiment is shown in FIG. 6.

Figure 6:
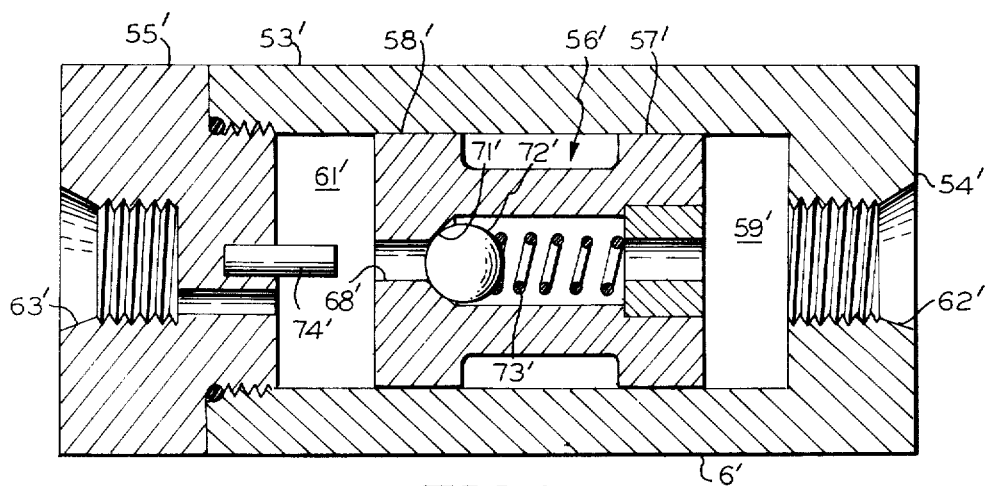
FIGS. 6 and 7 are sectional views of single-acting versions of the slack adjuster, the piston in each instance being shown in an intermediate position.

The alternative slack adjuster unit 6' of FIG. 6 is similar to its FIG. 1 counterpart, but employs a cylinder 53' having a uniform diameter, rather than the stepped cylinder used in the first unit. Because of this difference, the end portions 57' and 58' of the piston 56' in FIG. 6 have equal diameters; therefore, during brake applications, the pressure in working space 61' never rises above the pressure in working space 59', and valve 71', 72' remains closed unless and until spherical head 72' abuts pin 74'. Thus, during an application, fluid transfer from space 61' to space 59' is precluded, and consequently unit 6' is incapable of affording clearance-increasing compensation. Therefore, if shoe clearance at the commencement of the application is too small, cycling of one of the brakes will not serve to increase it.

Although valve 71', 72' in unit 6' does not open to permit fluid flow from space 61' during a brake application, it performs the same relief function as the valve 71, 72 of FIG. 1 under release conditions. Therefore, the increased clearance needed for shoe or wheel replacement can be created by manually prying back the associated cylinder, and the development of detrimentally high cylinder pressures as a result of thermal expansion of the fluid is precluded. Moreover, unit 6' affords slack take-up action during brake applications in exactly the same way as its FIG. 1 counterpart.

The single-acting slack adjuster 6' does not employ a differential area piston, and therefore it does not require or include the atmospheric vent port 66 used in the double-acting unit. The elimination of this port effects such a great reduction in the pressure differentials to which the piston-cylinder seals are subjected, that these seals in FIG. 6 may be defined merely by the fits between piston portions 57' and 58' and cylinder 53'. This obviates inclusion of auxiliary gaskets, such as the elastomeric O-rings shown in FIG. 1. In light of these differences, and the absence of a cylinder step, it is evident that unit 6' is somewhat less expensive to manufacture than double-acting unit 6.

DESCRIPTION OF THE EMBODIMENT OF FIG. 7

Since the piston portions 57' and 58' of the single-acting slack adjuster 6' of FIG. 6 have equal areas and do not carry elastomeric seals, the pressure differential required to initiate rightward movement of piston 56' at the commencement of a brake release will necessarily be smaller than the corresponding differential for the FIG. 1 slack adjuster. Therefore, unit 6' will not be affected by low release rates to as great an extent as the first embodiment. However, if such release rates do preclude closure of valve 71', 72', the problem can be solved by incorporating either the check valve 82–85 of FIG. 3 or the spring 86 of FIG. 4. Alternatively, valve spring 73' may be used for this purpose. In this case, the preload in the spring may have to be increased, but that can be done without affecting the pressure differential required to open valve 71', 72' by merely enlarging passage 68' so that a larger area of head 72' is exposed to the pressure in working space 61'. Another, and the presently preferred, solution to the problem is shown in FIG. 7.

Figure 7:
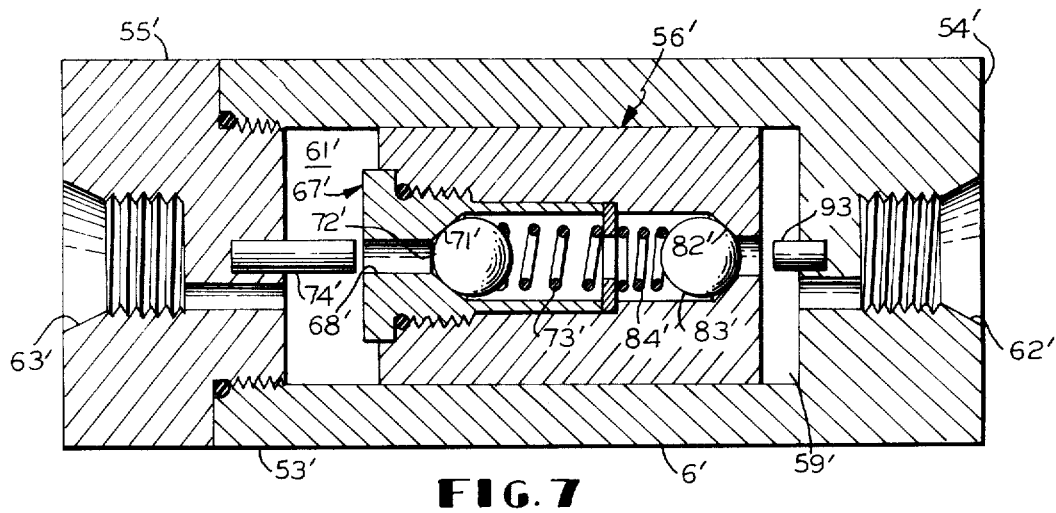

In the FIG. 7 version of the single-acting slack adjuster, detrimental reverse flow through valve 71', 72' is prevented by a check valve 82'–84' which is located in the transfer passage 68' extending through piston 56'. The check valve is oriented to block flow toward working space 59', but it is mechanically opened to allow such flow by a push rod 93 which engages the spherical valve head 82' just before piston 56' reaches the limit of its rightward travel (e.g. 1/16 inch before the piston abuts end wall 54').

During a brake application, check valve 82', 83' will be opened by the pressure in working space 59' when the head 72' of the transfer and relief valve is unseated by push rod 74'; therefore, the FIG. 7 slack adjuster will permit fluid flow from space 59' to space 61' as needed to take-up excessive shoe clearance. However, as soon as flow to space 61' ceases, check valve 82', 83' will close. Thus, when brake release is initiated, no fluid can escape from working space 61', and the pressure differential required to shift piston 56' to the right will be developed regardless of the rate at which the pressure in space 59' is dissipated. When piston 56' nears the end of its rightward or return stroke, check valve 82', 82' will be opened by push rod 93. Therefore, as in the preceding embodiments, the slack adjuster of FIG. 7 will afford relief action under release conditions.

It will be noted that, as piston 56' moves between its limiting positions, both of the valves 71', 72' and 82', 83' are closed, and a column of hydraulic fluid is confined in that portion of transfer passage 68' bounded by the seats 71' and 82'. Thus, when the piston approaches either limit of travel, mechanical unseating of the applicable valve head 72' or 83' will be resisted by the pressure in that fluid column. Normally, this pressure should not reach a level high enough to preclude proper operation because of the differences between the compressibilities of the hydraulic fluid and the metal valve seats and between the cross sectional areas of piston 56' and the push rods 74' and 93. However, in the event a hydraulic lock is encountered, the problem can be eliminated by merely placing in the isolated portion of passage 68' a piece of cellular elastic material. This expedient effectively increases the compressibility of the liquid column, and thus precludes development therein of detrimentally high pressures.

I claim:

1. A hydraulic slack adjuster comprising
  a. a pair of expansible chamber hydraulic motors having respective working spaces within a hydraulic cylinder which are of different diameters and are isolated from each other by movable reaction pistons in the respective chambers which are subject to the pressures in the respective spaces, said pistons being of different diameters and being connected in opposing relationship so that they move in unison in response to differences between pressures in the working spaces and vary in reverse senses the volumes of those spaces;
  b. cover plates at the ends of the cylinder for limiting motion of the pistons in both directions of movement;
  c. a spring biased relief check valve having a seat axially disposed in an axial opening through the pistons and responsive to difference in pressure in the chambers for permitting flow from the working space of smaller diameter to the working space of greater diameter whenever pressure in the smaller diameter chamber is materially greater than pressure in the larger diameter chamber irrespective of the position of the pistons;
  d. the cover plates having passages formed therein for delivering fluid to and from the respective working spaces;
  e. a detent extending axially within the passage adjoining the smaller diameter chamber for unseating the check valve when the pistons have completed their movement to the cover plate at the end of the smaller diameter chamber; and
  f. means for impeding back flow from the working space of the second motor to the working space of the first motor through the relief check valve when the pistons have reached their fully operated positions to the cover plate at the end of the smaller diameter chamber.

2. A slack adjuster as defined in claim 1 in which the relief valve means comprise a single valve carried by the reaction elements and interposed in a transfer passage interconnecting the working spaces the valve including a head which is biased closed against a seat by a spring and by the pressure in a first portion of the transfer passage which leads to the working space of the first device and is urged open by the pressure in a second portion of the transfer passage which leads to the other working space.

3. A slack adjuster as defined in claim 2 in which said check valve comprises
  a. a seat surrounding said second portion of the transfer passage;
  b. a head mounted for reciprocation axially on the detent;
  c. a spring biasing the head in the direction of the seat; and
  d. a stop limiting motion of the head along the actuator in the direction of the seat.

4. A slack adjuster as defined in claim 1 including a spring located in the smaller diameter working space and positioned to react between the associated piston and one of the cover plates and urge the piston toward the other of said cover plates during a terminal portion of the movement of the piston toward said one cover plate commencing just prior to engagement of said detent and the check valve.

* * * * *